United States Patent [19]
Zakka

[11] 3,746,305
[45] July 17, 1973

[54] INTERCHANGEABLE VALVE SEAT ASSEMBLY

[76] Inventor: Jorge C. Faraon Chaul Zakka, Avenue Revolucion No. 1579, Mexico City, 20, Mexico

[22] Filed: Dec. 8, 1970

[21] Appl. No.: 96,049

[52] U.S. Cl. ............................................. 251/360
[51] Int. Cl. ............................................ F16k 51/00
[58] Field of Search .................. 251/360, 359, 361, 251/362

[56] References Cited
UNITED STATES PATENTS

| | | | |
|---|---|---|---|
| 3,347,518 | 10/1967 | Curran | 251/362 X |
| 3,362,680 | 1/1968 | Weiss | 251/360 |
| 1,763,486 | 6/1930 | Strong | 251/360 |
| 3,487,823 | 1/1970 | Tarter et al. | 251/359 X |
| 3,022,978 | 2/1962 | Kowalski et al. | 251/362 |
| 2,985,424 | 5/1961 | Anderson et al. | 251/360 X |
| 1,891,460 | 12/1932 | Vlahek | 251/359 |
| 1,720,486 | 7/1929 | Leipert | 251/359 X |
| 1,795,433 | 3/1931 | Leipert | 251/359 X |
| 1,949,614 | 3/1934 | McDonald | 251/359 X |
| 3,471,123 | 10/1969 | Carlson et al. | 251/362 |

Primary Examiner—Samuel Scott
Attorney—Finnegan, Henderson & Farabow

[57] ABSTRACT

An interchangeable valve seat assembly for use with a variety of valves. A casing having a walled cavity therein is provided and a retaining base is formed integrally with the casing. An interchangeable and substantially annularly shaped valve seat is removably located within the cavity and is positioned in contacting and fluid-sealing relationship with the retaining base. The valve seat is readily replaceable to provide the valve with long life.

8 Claims, 7 Drawing Figures

PATENTED JUL 17 1973

3,746,305

INVENTOR
JORGE CESAR FARAON CHAUL ZAKKA

BY
Finnegan, Henderson & Farabow
ATTORNEYS

INTERCHANGEABLE VALVE SEAT ASSEMBLY

The present invention relates to certain useful improvements in valve seats to be used in the bodies of control valves, retention or check valves and safety valves, regardless of the type of obturation or plugging utilized.

Presently, various types of valve seats are used in order to establish a seal between the valve body and the plug means; however, while these valve seats have been of utility in their operation or aim, they are subject to certain disadvantages. For example, they have little resistance to wear and are difficult to maintain so that after a short period of use a perfect seal is no longer obtained.

Accordingly, the present invention provides a valve seat assembly which may be used in the valve body itself and which is substantially characterized by a simple design, easy maintenance, long life and high resistance to wear.

Specifically, the present invention includes a long life seat which may be used in the body itself of the valve, and which may be exchanged without any problem to provide and maintain a perfect seal.

Depending upon the diameter of the seats, the materials thereof, and the working pressures and temperatures, the valve seats of the present invention may be mounted and retained in the body of the valve as follows: (a) interchangeable seat introduced under pressure in a box or cavity having straight or angular walls and having a flat or escalated base with flange as required, which flange constitutes an abutting and retention means for that seat; (b) interchangeable seat screwed to a box or cavity of an adequate shape with threads and wherein the cavity has a flat or escalated base with a flange as required which flange serves as an abutting and retention means for the seat so that the latter may not leave its operative position in the lower part; (c) interchangeable seat introduced into a box or cavity which has an adequate shape with a threaded wall and which has a flat or escalated base with a flange or rim bead as may be required. The flange or bead serves as an abutting and retention means for a stepped flange of the seat which is pressed downwardly and which is retained at its upper part by an additional nut screwed to the threading of the cavity or casing of the body; (d) interchangeable seat introduced in a casing or cavity of an adequate shape which has a flat or stepped (escalated) base with a flange as required. This stepped flange serves as an abutting and retention means for the seat base when being introduced and pressed downwardly by a circular and open retention ring which is employed to retain the seat in its operative position notwithstanding the friction of the fluid flow through the valve. The circular and open retention ring is mounted and retained in an inner groove in the body casing, and notches are provided in the casing and in communication with the groove so that the ring can be easily extracted from its normal operative position.

Thus, the present invention relates to improvements in valve design and construction and also to the combination of elements in the seat assembly which are directly used in the bodies of the valve regardless of the type of plugging used. It should be clearly understood that it is possible to introduce changes or modifications in the elements within the scope of novelty of the present invention, and they may be used in conjunction or separately. The materials that are required for the seats of this invention may vary from metals to rubber, plastic, pastes and mixtures, as may be required.

Figure 3:
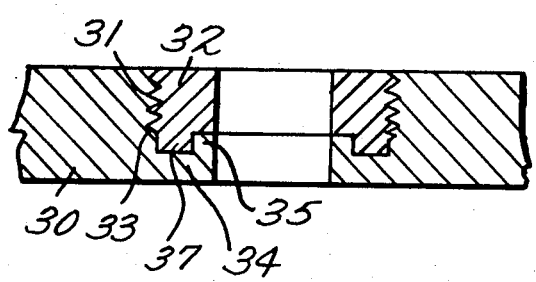

FIG. 3 illustrates a cross section of the seat part of the valve body and illustrates a casing or cavity having an adequate shape and size with a threading and also having at its base a flange or rim bead. This flange or bead receives and retains a stepped flange of the interchangeable seat as the seat is screwed into the cavity until it abuts against the base, and the flange or bead maintains the seat in its operative position.

Figure 4:
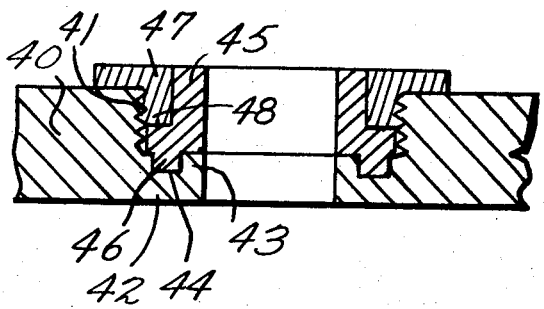

FIG. 4 illustrates a cross section of the seat part of the valve body and shows a casing or cavity with an adequate shape and size with a threading. The casing has at its base a step or flange to receive and retain a stepped flange of the interchangeable valve seat which is introduced, and in turn, pressed against the base of the casing by means of an additional nut.

Figure 5:
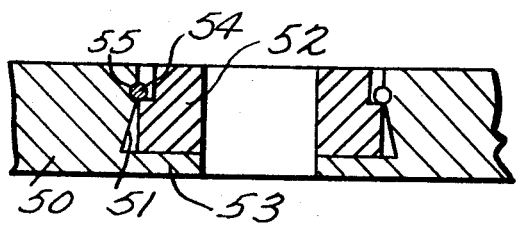

FIG. 5 illustrates a cross section of the seat part of the valve body and shows a casing or cavity having an adequate shape and size wherein an interchangeable valve seat is placed and wherein the seat is retained in the interior of the casing by means of a circular open ring or retention ring having a smaller inner diameter than the outer diameter of the interchangeable seat. The ring is mounted and retained in an inner groove in the casing of the body so as to maintain the seat in its operative position notwithstanding the friction caused by the fluid flow.

Figure 6:
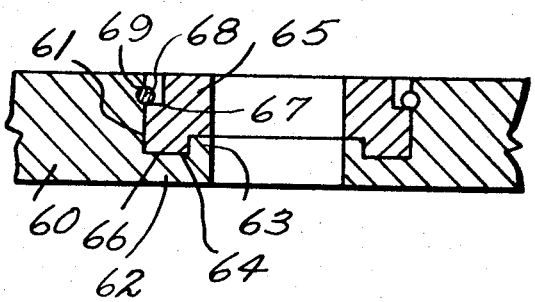

FIG. 6 illustrates a cross section of the seat part of the valve body and shows a casing or cavity having a suitable shape and size which has at its base a step or flange to receive and retain a stepped flange of the interchangeable valve seat which is pressed and retained in the interior of the casing by an open, circular retention ring. This ring has a smaller inner diameter than the outer diameter of the interchangeable seat, and the ring is mounted and retained in an inner groove of the casing of the body in order to hold the seat in its working position.

Figure 7:
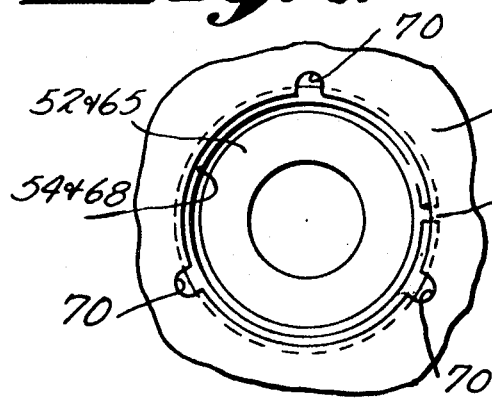

FIG. 7 is a plan view of the seat section of the valve body shown in FIGS. 5 and 6 wherein the open circular retention ring is illustrated within the groove for receiving and retaining the ring and wherein the notches necessary for taking the ring out of its working position are also shown.

Figure 1:
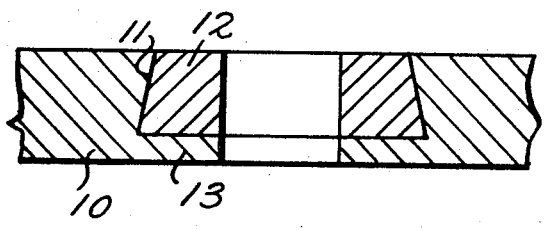
FIG. 1 illustrates a cross section of the seat detail of the valve body in accordance with one embodiment of the invention, and a casing or cavity with an adequate shape and a suitable size is illustrated wherein an interchangeable valve seat may be placed under pressure until it abuts against the base of the casing.

In accordance with one of the embodiments of the present invention, FIG. 1 shows a section of the seat part of a valve body 10, wherein a casing or cavity 11 may be observed. The cavity has a suitable shape and size and may have straight or angular walls. In the interior thereof, an interchangeable seat 12 is introduced under pressure. This annular seat, after being introduced and pushed down within the casing 11, is retained by a lower base 13 integral with the casing.

Figure 2:
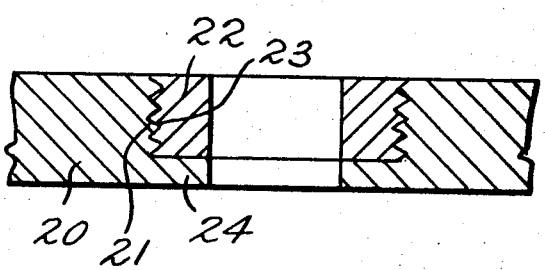
FIG. 2 illustrates a cross section of the seat part of the valve body and illustrates a casing or cavity having a suitable shape and size with a threading engaging an interchangeable valve seat until the seat abuts against the base of the casing.

FIG. 2 shows a cross section of the part of a valve body 20 wherein a threaded casing or cavity 21 may be observed. An interchangeable seat 22 is screwed by its own threading 23 until it abuts against base 24 of the casing.

FIG. 3 shows a cross section of the seat part of a valve body 30 which has a threaded cavity 31. An interchangeable threaded seat 32 is screwed by its own threading 33 until it abuts a base 34 of the seat of the body. Base 34 has a stepped flange 35 which is useful to retain a lower stepped flange 37 of seat 32, thus preventing separation of the threading 33 of seat 32 from the threading of casing 31.

FIG. 4 shows a cross section of the seat part of a valve body 40 wherein a threaded casing 41 may be observed with a seat base 42 and a flange or rim bead 43. The flange is located adjacent to the aperture in base 42 and is spaced from the cavity wall to define an annular receiving space. In the interior of casing 41 there is positioned an interchangeable seat 45, which has at its base a stepped flange 46. Seat 45 is provided with a ledge 48 formed at its periphery above stepped flange 46. Stepped flange 46 is pressed downwardly into the annular receiving space and against casing 44 by a nut 47 of any suitable material which engages ledge 48. Nut 47 is threaded and engages the threaded casing 41. The nut also acts to press the seat upon stepped flange 43 and causes the stepped flange 46 to be pressed against casing 44 to avoid leaks.

FIG. 5 shows a cross section of the seat part of a valve body 50. A casing or cavity 51 is located within the body and has a suitable shape and size. The walls of the cavity may be straight or angular and an interchangeable seat 52 of the valve is placed and retained within cavity 51. This seat 52 when pressed downwardly abuts against a base 53 of the same body. To maintain this seat 52 in its operative position notwithstanding the friction of the fluid flow through the valve an open O-ring or retention ring 54 is employed. The ring has a smaller inner diameter than the outer diameter of interchangeable seat 52, and this open retention ring, in turn, is mounted and retained in a groove 55, which is also placed in the interior and in the upper part of the casing 51 of body 50. In order to readily get the open circular retention ring out of its working position, notches are used, which are shown in FIG. 7.

FIG. 6 shows a cross section of the seat part of a valve body 60, and further illustrates a casing or cavity 61 which has a suitable shape and size. A seat base 62 and a flange 63 form the lower casing 64 of the body. In the interior of casing 61 there is housed an interchangeable seat 65, which has at its base a stepped flange 66 which enters into the lower casing 64 and which is retained by flange 63. Interchangeable seat 65 is retained at its upper part by means of an open circular retention ring 68 which has a smaller inner diameter than the outer diameter of the seat. This open circular retention ring 68 is mounted and is retained in a groove 69 within body 60, and the ring presses against interchangeable seat 65 within the step or bevel 67. Groove 69, which is used to receive and retain the open circular ring 68, is located in the interior and on the upper part of casing 61. To get the open circular retention ring out of its working position, some notches are used and are illustrated in FIG. 7.

FIG. 7 is a plan view of the embodiment of FIGS. 5 and 6 and specifically illustrates the open circular retention rings 54 and 68, the grooves 55 and 69 for receiving and retaining the rings and notches 70 which are required to readily get the open circular retention rings 54 and 68 out of their working positions in grooves 55 and 69.

In a possible modification of a valve seat assembly to be directly used in the valve body itself, in accordance with the present invention, it is possible to use any of the applications described, individually or in combinations, as may be required.

The component parts of any valve seat assembly to be used in the valve body itself, according to the principles of the present invention, may have a similar or same design as the one described, and also the material may be varied from metals to rubber, pastes, plastics or mixtures, as may be required.

The invention in its broader aspects is not limited to the specific details shown and described and departures may be made from such details without departing from the principles of the invention and without sacrificing its chief advantages.

What is claimed is:

1. An interchangeable valve seat assembly for use in a valve body, said valve seat assembly comprising:
   a casing having a walled cavity therein;
   a retaining base integral with said casing and defining an aperture in fluid communication with said cavity;
   an interchangeable and substantially annularly shaped valve seat removably located within the cavity and in contacting and fluid-sealing relationship with said retaining base;
   a first stepped flange integral with the retaining base, said first stepped flange being located adjacent to said aperture and spaced from said cavity to define an annular receiving space;
   a second stepped flange integral with said seat, said second stepped flange being formed at the outer periphery of said seat and located in said annular receiving space in engagement with said first stepped flange; and
   retaining means for holding said seat in a position where said first stepped flange is in contact and fluid-sealing relationship with said second stepped flange.

2. A valve seat assembly as in claim 1 wherein said retaining means comprises an outer threaded wall on said valve seat, the cavity is substantially cylindrical in shape and the wall of said cavity is threaded to removably receive and engage the outer threaded wall of the seat.

3. A valve seat assembly as in claim 1, wherein:
   said first stepped flange on said retaining base projects perpendicularly upward from said retaining base; and
   said second stepped flange located adjacent to the outer periphery of said valve seat projects perpendicularly downward from its lower surface for engagement with said first flange formed on said retaining base.

4. A valve seat assembly as in claim 1 wherein the cavity is substantially cylindrical in shape and the wall of the cavity is threaded, and said retaining means comprises a threaded nut engaging the threaded cavity wall and contacting the seat to press the seat into fluid-sealing relationship with the retaining base.

5. A valve seat assembly as in claim 4 wherein the seat includes a ledge formed at its periphery above said second stepped flange, said nut engaging said ledge and forcing the second stepped flange of the seat into said annular receiving space and into fluid-sealing relationship with the retaining base and the first stepped flange of the base.

6. A valve seat assembly as in claim 1 wherein the wall of the cavity has a groove therein and said retaining means comprises a retention ring positioned within the groove for retaining the seat in position in fluid-sealing relationship with the retaining base.

7. A valve seat assembly as in claim 6 wherein the retention ring has an inner diameter smaller than the outer diameter of the annularly shaped seat.

8. An interchangeable valve seat assembly for use in a valve body, said valve seat assembly comprising:
a casing having a walled cavity therein, the wall of said cavity having a groove;
a retaining base integral with said casing and defining an aperture in fluid communication with said cavity;
an interchangeable and substantially annularly shaped valve seat removably located within the cavity and in contacting and fluid-sealing relationship with said retaining base;
a stepped flange integral with the retaining base; and
a retention ring positioned within the groove for retaining the seat in position in fluid-sealing relationship with the retaining base, said retention ring having an inner diameter smaller than the outer diameter of the annularly shaped seat; and
said casing including notches in communicating relationship with said groove whereby a tool or other device can be inserted into one or more of the notches to remove the retention ring from the groove and to permit removal of the seat.

* * * * *